United States Patent [19]

Kaminade et al.

[11] Patent Number: 4,999,416
[45] Date of Patent: Mar. 12, 1991

[54] WHOLLY AROMATIC POLYESTERS

[75] Inventors: Tadahiro Kaminade, Kawasaki; Shigeki Iida, Yokohama; Tomohiro Toya, Yokohama; Hajime Hara, Fujisawa, all of Japan

[73] Assignee: Nippon Oil Company, Limited, Tokyo, Japan

[21] Appl. No.: 467,383

[22] Filed: Jan. 19, 1990

[30] Foreign Application Priority Data

Jan. 25, 1989 [JP] Japan .................................. 1-14109

[51] Int. Cl.$^5$ ............................................ C08G 63/02
[52] U.S. Cl. .................... 528/190; 528/171; 528/173; 528/174; 528/176; 528/191; 528/193
[58] Field of Search ............... 528/171, 173, 174, 176, 528/190, 193, 191

[56] References Cited

U.S. PATENT DOCUMENTS

| | | | |
|---|---|---|---|
| 3,308,095 | 3/1967 | Maerov et al. ...................... | 528/190 |
| 3,637,595 | 1/1972 | Cottis et al. ....................... | 260/47 C |
| 3,778,410 | 12/1973 | Kuhfuss et al. .................... | 260/47 C |
| 3,884,876 | 5/1975 | Cottis et al. ....................... | 528/193 |
| 3,890,256 | 6/1975 | McFarlane et al. ............... | 260/47 C |
| 4,075,262 | 2/1978 | Schaefgen .......................... | 260/860 |
| 4,159,365 | 6/1979 | Payet .................................. | 428/364 |
| 4,161,470 | 7/1979 | Calundann ......................... | 260/40 P |
| 4,219,461 | 8/1980 | Calundann ......................... | 260/40 P |
| 4,294,955 | 10/1981 | Harris, Jr. ........................... | 528/176 |
| 4,330,457 | 5/1982 | East et al. ........................... | 524/602 |
| 4,489,190 | 12/1984 | Froix ................................... | 524/539 |
| 4,684,712 | 8/1987 | Ueno et al. ......................... | 528/194 |

FOREIGN PATENT DOCUMENTS 1507207 4/1978 United Kingdom .

Primary Examiner—Harold D. Anderson
Assistant Examiner—T. Mosley
Attorney, Agent, or Firm—Scully, Scott, Murphy & Presser

[57] ABSTRACT

Provided is a wholly aromatic polyester superior in melt processability and tenacity which consists essentially of the following structural units (A), (B) and (C) and wherein 0.2 to 40 mole % of the total of said units are of ortho configuration;

(A)

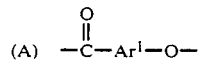

(B)

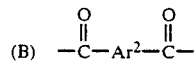

(C)

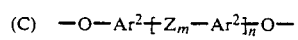

where $Ar^1$ and $Ar^2$ each represent a divalent aromatic hydrocarbon group having 6 to 20 carbon atoms, the hydrogen atoms of said aromatic hydrocarbon group may be substituted with a halogen atom, an alkyl or alkoxy group having 1 to 4 carbon atoms, or phenyl; Z is

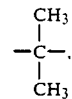

—O—, or —SO$_2$—; m is 0 or 1, at least 60 mole % of $Ar^1$ being constituted by a group selected from 1,4-phenylene, substituted 1,4-phenylenes, naphthyl and 4,4'-biphenyl.

4 Claims, No Drawings

WHOLLY AROMATIC POLYESTERS

BACKGROUND OF THE INVENTION

The present invention relates to wholly aromatic polyesters, particularly wholly aromatic polyesters superior in melt processability and tenacity.

Recently there has been an increasing demand for upgrading of organic, high molecular materials so that there can be obtained fibers, films and moldings superior in mechanical properties such as tensile strength and modulus and in heat resistance.

As a high molecular material which satisfies the above demand there is known a rigid-rod polymer wherein only aromatic rings are linked together in the form of a straight chain. But this polymer is very poor in its solubility to solvents and the melting point thereof is very high. For this reason it has been difficult to effect processing in the state of a solution or in a melted state.

For solving the above problem there have been proposed a method of introducing an aliphatic chain in the main chain, a method of introducing therein an m-substituted compound, a method of introducing therein a 2,6-substituted naphthalene ring, and a method of introducing in an aromatic ring a bulky substituent such as alkyl, halogen, or phenyl. Since the melting point can be lowered by these methods, it becomes possible to effect melt molding, and particularly in a liquid crystal phase, the fluidity is improved and so it becomes easy to perform molding. As typical examples of prior art publications disclosing polymers which exhibit such melt anisotropy there are mentioned Japanese Patent Publications Nos. 47870/1972 and 482/1980, 18016/1981 and 13531/1984 as well as Japanese Patent Laid-Open Nos. 65421/1978, 77691/1979, 144024/1980, 172921/1982, 69199/1979 and 25354/1982.

In those methods, however, there remain many problems to be solved. In the case where an aliphatic chain is copolymerized with the main chain, the resulting polymer is inferior in its mechanical properties and the heat resistance is impaired markedly. Also in the introduction of an m-substituted compound by copolymerization, the mechanical properties of the resulting copolymer are not always satisfactory and the tenacity is impaired. The method of introducing a 2,6-substituted naphthalene ring can afford superior mechanical properties, but the retention of strength at high temperatures is not satisfactory and the monomer is expensive. The method of introducing a bulky substituent is also disadvantageous in that the retention of strength at high temperatures is not satisfactory and the monomer is expensive.

It is the object of the present invention to provide a wholly aromatic polyester capable of being subjected to melt molding and superior in tenacity such as high impact resistance while having superior heat resistance.

SUMMARY OF THE INVENTION

The present invention resides in a wholly aromatic polyester consisting essentially of the following structural units (A), (B) and (C) and wherein 0.2 to 40 mole % of the total of said units are of ortho configuration:

(A) 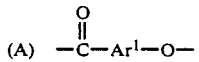

(B) 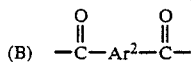

(C) 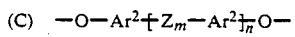

where $Ar^1$ and $Ar^2$ each represent a divalent aromatic hydrocarbon group having 6 to 20 carbon atoms, the hydrogen atoms of the said aromatic hydrocarbon group may be substituted with a halogen atom, an alkyl or alkoxy group having 1 to 4 carbon atoms, or phenyl; Z is

—O—, or —SO$_2$—; m is 0 or 1; and n is 0 or 1, at least 60 mole % of $Ar^1$ being constituted by a group selected from 1,4-phenylene, substituted 1,4-phenylenes, naphthylene and 4,4',-biphenyl.

DETAILED DESCRIPTION OF THE INVENTION

As examples of Ar1 and Ar2 there are mentioned 1,2-phenylene, 1,3-phenylene, 1,4-phenylene, substituted 1,4-phenylenes such as 2-chloro-1,4-phenylene, 2-fluoro-1,4-phenylene, 2-methyl-1,4-phenylene, 2-ethyl-1,4-phenylene, 2-[tert-butyl]-1,4-phenylene, 2-methoxy-1,4-phenylene, 2-ethoxy-1,4-phenylene, 2-phenyl-1,4-phenylene and 2,6-dimethyl-1,4-phenylene, 1,2-naphthyene, 1,4-naphthyene, 1,5-naphthyene, 2,6-naphthyene, and 4,4'-biphenyl.

The "structural unit of ortho configuration" in the present invention means a structural unit typified by the following:

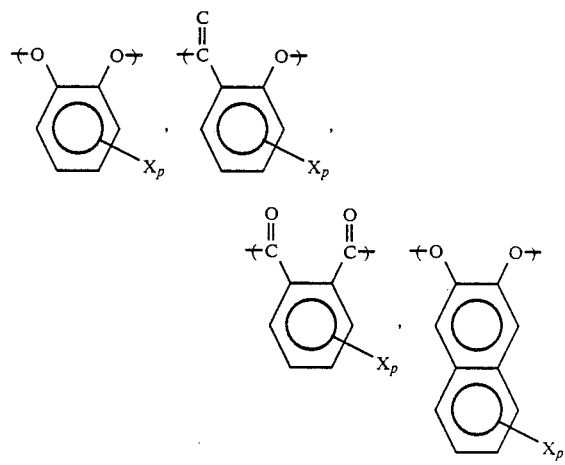

wherein X represents a substituent group and p is 0 to 2.

The structural unit (A) is derived from an aromatic hydroxycarboxylic acid or a derivative thereof (e.g. acetylated derivative), and it is present in an amount in the range of 1 to 99 mole %, preferably 10 to 90 mole %, more preferably 30 to 70 mole %, of all the structural units in the polyester.

The structural unit (B) is derived from an aromatic dicarboxylic acid or a derivative thereof (e.g. dimethyl ester), and it is present in an amount in the range of 5 to 50 mole %, preferably 10 to 40 mole %, of all the structural units in the polyester.

The structural unit (C) is derived from an aromatic diol or a derivative thereof (e.g. diacetylated derivative), and it is present in an amount in the range of 5 to 50 mole %, preferably 10 to 40 mole %, of all the structural units in the polyester. The structural units (B) and (C) are present in a substantially equal number of moles in the polyester.

It is essential in the present invention that 0.2-40 mole %, preferably 1-30 mole %, more preferably 2-20 mole % of the total of said units are of ortho configuration. This is an essential condition for obtaining a wholly aromatic polyester capable of being subjected to melt molding and superior in tenacity while having superior heat resistance. If the proportion of the structural unit of ortho configuration is less than 0.2 mole %, it will be less effective in improving tenacity, while if it is more than 40 mole %, the resulting polyester will not exhibit melt anisotropy and its mechanical properties will be poor.

As suitable examples of compounds which afford the structural unit (A) there are mentioned p-hydroxybenzoic acid, m-hydroxybenzoic acid, salicylic acid, 4-hydroxy-3-chlorobenzoic acid, 4-hydroxy-3-methylbenzoic acid, 4-hydroxy-3,5-dimethylbenzoic acid, 2-hydroxy-6-naphthoic acid, 1-hydroxy-5-naphthoic acid, 1-hydroxy-4-naphthoic acid, syringic acid, vanillic acid, and 4-huydroxy-4'-biphenylcarboxylic acid. These compounds may be used each alone or as a mixture of two or more. For maintaining melt anisotropy, it is necessary that at least 60 mole %, preferably not less than 80 mole %, of $Ar^1$ contain a linear chain extension bond selected from 1,4-phenylene, substituted 1,4-phenylenes, 2,6-naphthyl and 4,4'-biphenyl.

As suitable examples of compounds which afford the structural unit (B) there are mentioned terephthalic acid, methoxyterephthalic acid, ethoxyterephthalic acid, fluoroterephthalic acid, chloroterephthalic acid, methylterephthalic acid, isophthalic acid, phthalic acid, methoxyisophthalic acid, diphenyl-4,4'-dicarboxylic acid, naphthalene-2,6-dicarboxylic acid, naphthalene-1,5-dicarboxylic acid, naphthalene-1,4-dicarboxylic acid, and naphthalene-1,2-dicarboxylic acid. These compounds may be used each alone or as a mixture of two or more.

As suitable examples of compounds which afford the structural unit (C) there are mentioned hydroquinone, catechol, resorcinol, methylhydroquinone, chlorohydroquinone, phenylhydroquinone, 1,2-dihydroxynaphthalene, 1,4-dihydroxynaphthalene, 2,6-dihydroxynaphthalene, 2,2'-bix(4-hydroxyphenyl)propane, 4,4'-biphenol, 4,4'-dihydroxydiphenyl ether, and 4,4'-dihydroxydiphenyl sulfone. These compounds may be used each alone or as a mixture of two or more.

The polyester of the present invention can be prepared by any of various ester forming reactions, but usually it is prepared by melt polymerization. Preferably there is adopted a method in which starting compounds which afford the structural units (A) and (C) are fed after conversion of their hydroxyl groups into the form of a lower alkyl ester and a polycondensation reaction is allowed to proceed by an ester interchange reaction. As the lower alkyl ester, acetate is most preferred.

The polycondensation reaction will proceed even in the absence of catalyst, but the use of a knwon ester interchange catalyst may afford a preferable result in point of accelerating a polymerization. The catalyst may be used in an amount in the range of 0.001 to 1 wt %, preferably 0.005 to 0.5 wt5, of the total monomer weight. Examples of such catalyst include alkali metal carboxylates, alkaline earth metal carboxylates, alkyltin oxides, diaryltin oxides, alkylstannic acids, titanium dioxide, alkoxytitanium silicates, titanium alkoxides, Lewis acids, and hydrogen halides.

The melt polymerization is performed at a temperature in the range of usually 150° to 375° C., preferably 200° to 350° C., in an inert gas atmosphere such as nitrogen or argon, under passing of the said gas, or under reduced pressure. As the polymerization proceeds, acetic acid will be distilled out in the case of using acetate monomers, so according to the amount thereof distilled out and the polymer viscosity the reaction temperature is raised and the degree of pressure reduction is adjusted. The polymerization time is usually in the range of 1 to 10 hours. After completion of the melt polymerization, the polymer may be pulverized finely and the polymerization may be further proceeded in solid phase at a temperature below the melting point of the polymer to increase the degree of polymerization.

The polyester of the present invention exhibits an inherent viscosity of 0.5 to 10 dl/g, preferably, 1 to 7 dl/g as determined at 60° C. at a concentration of 0.1 wt/vol % in pentafluorophenol. If its inherent viscosity is lower than 0.5 dl/g, the polyester will be twoo small in molecular weight and inferior in mechanical properties, while if its inherent viscosity is higher than 10 dl/g, it will become difficult for the polyester to be subjected to melt processing.

The inherent viscosity, ηinh, is calculated as follows:

$$\eta inh = \frac{\ln t/t_o}{c}$$

$t_o$: dropping time of pentafluorophenol as a solvent as determinded at 60° C. using a Ubbelohde's viscometer $t$: dropping time of a solution of sample dissolved therein $c$: concentration of the sample (g/dl)

By a conventional melt molding method the polyester of the present invention can be formed into films, sheets, injection moldings and various other moldings. As compared with moldings obtained from conventional thermotropic liquid crystalline polyesters, the moldings obtained from the polyester of the present invention are superior in elongation at break and tenacity, so it is possible to make the most of the characteristic features of the polyester of the invention in its use as films, sheets, or moldings.

The present invention will be described below in terms of working examples thereof, but it is to be understood that the invention is not limited thereto.

EXAMPLE 1

A polymerization example will be described below, in which catechol was used as a monomer affording the structural unit of ortho configuration and was fed 2.5 mole %.

4.0 moles (720 g) of p-acetoxybenzoic acid, 2.0 moles (332 g) of terephthalic acid, 1.81 moles (489 g) of biphenol diacetate and 0.20 mole (39 g) of catechol diacetate were fed into a 3-liter autoclave equipped with a stirrer, a gas inlet, a distillation head and a reflux condenser. Then, the autoclave was evacuated to vacuum and purged with nitrogen. Thereafter, heating was made up to 100° C. in a nitrogen atmosphere. When the temperature reached 100° C., stirring was started. After holding 0.5 hour at each of 100°, 130°, 150° and 180° C., the temperature was raised to 200° C. Then, from 200° C. up to 330° C. heating was continued with stirring at a rate of 30° C./hr while acetic acid was distilled off. The resulting polymer was then withdrawn, solidified and thereafter pulverized. The polymer thus pulverized was subjected to a solid-phase polymerization in a vacuum of 1 mmHg in a rotary evaporator at 180° C. for 0.5 hour, 220° C. for 1 hour, 240° C. for 1 hour, 250° C. for 1 hour, 260° C. for 1 hour, 270° C. for 1 hour and 280° C. for 6 hours. The resulting polymer exhibited an inherent viscosity of 3.3 dl/g as measured at 60° C. at a concentration of 0.1 wt/vol % in pentafluorophenol.

When the polymer was subjected to a thermal analysis at the heat-up rate of 20° C./min using a differential scanning calorimeter (DSC), an endothermic peak was observed at 362° C. Further, using a hot stage, the polymer in a melted state was observed by means of a polarizing microscope under a crossed nicol. As a result, the polymer exhibited melt anisotropy optically.

A test piece obtained by injection molding of the polymer after the solid-phase polymerization was measured for bending strength and bending modulus according JIS K7203 and also measured for notched Izod impact strength according to JIS K7110. The results are as shown in Table 1.

EXAMPLE 2

A polymeization example will be described below, in which catechol was used as a monomer affording the structural unit of ortho configuration and was fed 6.2 mole %.

According to the method used in Example 1, 4.0 moles (720 g) of p-acetoxybenzoic acid, 2.0 moles (332 g) of terephthalic acid, 1.51 moles (407 g) of biphenol diacetate and 0.5 mole (98 g) of catechol diacetate were fed and polymerization was conducted. Provided, however, that after reaching 330° C., the polymer was held at the same temperature for 1 hour and then withdrawn. The polymer after pulverized was subjected to a solid-phase polymerization in the same manner as in Example 1 to afford a polymer having an inherent viscosity of 3.9 dl/g. In the DSC measurement the polymer was found to have a melting point of 341° C., and it exhibited melt anisotropy optically. Mechanical properties of a molded product obtained from this polyer are as shown in Table 1.

EXAMPLE 3

A polymerization example will be described below, in which catechol was used as a monomer affording the structural unit of ortho configuration and was fed 12.5 mole %.

According to the method used in Example 1, 4.0 moles (720 g) of p-acetoxybenzoic acid, 2.0 moles (332 g) of terephthalic acid, 1.01 moles (270 g0 of biphenol diacetate and 1.0 mole (194 g) of catechol diacetate were fed and polymerization was conducted. Provided, however, that after reaching 330° C., the polymer was held at the same temperature for 2 hours and then withdrawn. The polymer after pulverized was subjected to a solid-phase polymerization in the same manner as in Example 1 to afford a polymer having an inherent viscosity of 4.1 dl/g. In the DSC measurement the polymer did not exhibit a clear melting point, but at temperatures not lower than about 300° C. it exhibited melt anisotropy optically. Mechanical properties of a molded product obtained from the polymer are as shown in Table 1.

EXAMPLE 4

A polymerization example will be described below, in which salicylic acid was used as a monomer affording the structural unit of ortho configuration and was fed 6.2 moles.

According to the method used in Example 1, 3.5 moles (630 g) of p-acetoxybenzoic acid, 0.5 mole (90 g) of acetylsalicylic acid, 2.0 moles (332 g) of terephthalic acid and 2.01 moles (543 g) of biphenol diacetate were fed and polymerization was conducted. Provided, however, that after reaching 330° C., the polymer was held at the same temperature for 1 hour and then withdrawn. The polymer after pulverized was subjected to a solid-phase polymerization in the same way as in Example 1 to afford a polymer having an inherent viscosity of 3.5 dl/g. In the DSC measurement the polymer was found to have a melting point of 345° C., and it exhibited melt anisotropy optically. Mechanical properties of a molded product obtained from the polymer are as shown in Table 1.

EXAMPLE 5

A polymerization example will be described below, in which catechol was used as a monomer affording the structural unit of ortho configuration and was fed 6.2 mole %.

According to the method used in Example 1, 4.0 moles (720 g) of p-acetoxybenzoic acid, 2.0 moles (332 g) of terephthalic acid, 1.51 moles (296 g) of hydroquinone diacetate and 0.5 mole (98 g) of catechol diacetate were fed and polymerization was conducted. Proviced, however that after reaching 330° C., the polymer was held at the same temperature for 0.5 hour and then withdrawn. The polymer after pulverized was subjected to a solid-phase polymerization in the same way as in Example 1 to afford a polymer having an inherent viscosity of 3.9 dl/g. In the DSC measurement the polymer was found to have a melting point of 350° C. and it exhibited melt anisotropy optically. Mechanical properties of a molded product obtained from the polymer are as set forth in Table 1.

COMPARATIVE EXAMPLES 1-3

In place of catechol diacetate of Examples 1-3 there was used isophthalic acid as a monomer component for disarranging the linearity of the polymer chains to lower their melting points. Monomer compositions are as tabulated below.

|  | p-Acetoxybenzoid acid (mole) | Terephthalic acid (mole) | Isophthalic acid (mole) | Biphenyl diacetate (mole) |
| --- | --- | --- | --- | --- |
| Comp. Ex. 1 | 4.0 | 1.8 | 0.2 | 2.01 |
| Comp. Ex. 2 | 4.0 | 1.5 | 0.5 | 2.01 |
| Comp. Ex. 3 | 4.0 | 1.0 | 1.0 | 2.01 |

Polymerizations and solid-phase polymerizations were performed according to the respective corresponding Examples 1-3. The following table shows melting points of the resulting polymers determined from endothermic peaks observed in the DSC measurement, as well as inherent viscosities of the polymers. All of the polymers exhibited melt anisotropy.

|  | m.p. (oc) | $\eta$ inh (dl/g) |
|---|---|---|
| Comp. Ex. 1 | 383 | could not be determined, because of poor solubility. |
| Comp. Ex. 2 | 358 | 3.2 |
| Comp. Ex. 3 | 325 | 4.2 |

Mechanical properties of molded products obtained from the polymers are as set forth in Table 1.

TABLE 1

| | Monomer component disarranging linearity (mole %) | Mechanical Properties of Molded Product | | |
|---|---|---|---|---|
| | | Bending Strength (kg/cm²) | Bending Modulus (kg/cm²) | Notched Izod Impact Strength (kg.cm/cm) |
| Ex.1. | catechol(2.5) | $1.75 \times 10^3$ | $13.5 \times 10^4$ | 35 |
| 2. | catechol(6.25) | $1.66 \times 10^3$ | $10.0 \times 10^4$ | 38 |
| 3. | catechol(12.5) | $1.46 \times 10^3$ | $11.2 \times 10^4$ | 90 |
| 4. | salicylic acid(6.25) | $2.01 \times 10^3$ | $9.0 \times 10^4$ | 50 |
| 5. | catechol(6.25) | $1.33 \times 10^4$ | $9.8 \times 10^4$ | 44 |
| Comp.Ex.1. | isophthalic acid(2.5) | $1.40 \times 10^4$ | $12.6 \times 10^4$ | 20 |
| 2. | isophthalic acid(6.25) | $1.03 \times 10^3$ | $6.5 \times 10^4$ | 15 |
| 3. | isophthalic acid(12.5) | $1.38 \times 10^3$ | $8.7 \times 10^4$ | 55 |

According to the present invention, as set forth above, there is provided a wholly aromatic polyester superior in tenacity such as strength and impact resistance while retaining high heat resistance.

What is claimed is:

1. A wholly aromatic polyester consisting essentially of structural units (A), (B) and (C), said units having the structural formulae (A) 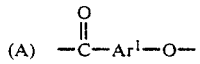

(B) 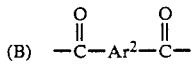

(C) 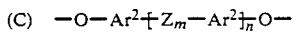

wherein Ar¹ and Ar² each represent a divalent aromatic hydrocarbon group having 6 to 20 carbon atoms, unsubstituted or substituted with a halogen atom, an alkyl or alkoxy group having 1 to 4 carbon atoms or phenyl; Z is

—O—, or —SO₂—;

m is 0 or 1; and n is 0 or 1, with the provisos that 0.2 to 40 mole %, based on the total molar concentration of said units, are in the ortho configuration and at least 60 mole % of Ar¹, based on the total molar concentration of Ar¹, is selected from the group consisting of 1,4-phenylene, substituted 1,4-phenylenes, naphthyl and 4,4'-biphenyl.

2. A wholly aromatic copolyester as set forth in claim 1, containing the structural units (A), (B) and (C) at proportions of 1-99 mole %, 5-50 mole % and 5-50 mole %, respectively, the structural units (B) and (C) being present at substantially equimolar proportions.

3. A wholly aromatic polyester as set forth in claim 1 wherein said structural unit (A) and (B) are independently 1,2-phenylene, 1,3-phenylene, 1,4-phenylene, 2-chloro-1,4-phenylene, 2-fluoro-1.4-phenylene, 2-methyl-1,4-phenylene, 2-ethyl-1,4-phenylene, 2-[tert-buytl]-1,4-phenylene, 2-methoxy-1,4-phenylene, 2-ethoxy-1,4-phenylene, 2-phenyl-1,4-phenylene and 2,6-dimethyl-1,4-phenylene, 1,2-naphthyl, 1,4-naphthyl, 1,5-naphthyl, 2,6-naphthyl or 4,4'-biphenyl.

4. A wholly aromatic polyester as set forth in claim 1, wherein said structural unit (C) derives from hydroquinone, catechol, resorcinol, methylhydroquinone, chlorohydroquinone, phenylhydroquinone, 1,2-dihydroxynaphthalene, 1,4-dihydroxynaphthalene, 2,6-dihydroxynaphthalene, 2,2'-bis(4-hydroxyphenyl)propane, 4,4'-biphenol, 4,4'-dihydroxydiphenyl ether or 4,4'-dihydroxydiphenyl sulfone.

* * * * *

UNITED STATES PATENT AND TRADEMARK OFFICE
CERTIFICATE OF CORRECTION

PATENT NO. : 4,999,416

DATED : March 12, 1991

INVENTOR(S) : Tadahiro Kaminade, et al.

It is certified that error appears in the above-identified patent and that said Letters Patent is hereby corrected as shown below:

Column 4, line 42: "of sample" should read as --of a sample--

Column 7, line 30: "$1.40 \times 10^4$" should read as --$1.40 \times 10^3$--

Signed and Sealed this

Twenty-second Day of September, 1992

*Attest:*

DOUGLAS B. COMER

*Attesting Officer*      *Acting Commissioner of Patents and Trademarks*